(12) United States Patent
Yasuhara et al.

(10) Patent No.: US 8,418,674 B2
(45) Date of Patent: Apr. 16, 2013

(54) CONTROL DEVICE OF DIESEL ENGINE AND METHOD OF CONTROLLING DIESEL ENGINE

(75) Inventors: Kousuke Yasuhara, Yokohama (JP); Yasutaka Ishibashi, Yokohama (JP); Naoki Nagashima, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 528 days.

(21) Appl. No.: 12/716,756

(22) Filed: Mar. 3, 2010

(65) Prior Publication Data
US 2010/0224168 A1    Sep. 9, 2010

(30) Foreign Application Priority Data
Mar. 4, 2009    (JP) ................... 2009-050580

(51) Int. Cl.
*F02P 5/04*    (2006.01)
*F02B 3/00*    (2006.01)

(52) U.S. Cl.
USPC .............. 123/406.23; 123/406.47; 123/299

(58) Field of Classification Search ............ 123/406.16, 123/406.23, 406.29, 406.34, 406.37, 406.38, 123/406.47; 701/105, 110, 111, 113, 114; 73/35.04, 35.06, 35.07, 35.09
See application file for complete search history.

(56) References Cited

U.S. PATENT DOCUMENTS

| | | | | |
|---|---|---|---|---|
| 4,658,789 A | * | 4/1987 | Morita | 123/406.36 |
| 4,793,310 A | * | 12/1988 | Komurasaki | 123/406.34 |
| 4,967,710 A | * | 11/1990 | Komurasaki et al. | 123/406.16 |
| 6,334,353 B1 | * | 1/2002 | Nobe et al. | 73/35.04 |
| 7,286,924 B2 | * | 10/2007 | Demura et al. | 701/111 |
| 8,151,627 B2 | * | 4/2012 | Masuda et al. | 73/35.06 |
| 2004/0182360 A1 | * | 9/2004 | Mashiki | 123/305 |
| 2005/0098156 A1 | * | 5/2005 | Ohtani | 123/431 |
| 2006/0137648 A1 | * | 6/2006 | Nakashima et al. | 123/299 |
| 2007/0175444 A1 | * | 8/2007 | Kaneko et al. | 123/406.16 |
| 2007/0215108 A1 | * | 9/2007 | Kaneko et al. | 123/406.34 |
| 2007/0215109 A1 | * | 9/2007 | Kaneko et al. | 123/406.34 |
| 2008/0022976 A1 | * | 1/2008 | Morimoto et al. | 123/478 |

FOREIGN PATENT DOCUMENTS

| | | |
|---|---|---|
| CN | 101375051 A | 2/2009 |
| JP | 9-144583 | 6/1997 |

* cited by examiner

*Primary Examiner* — John T. Kwon
*Assistant Examiner* — Johnny Hoang
(74) *Attorney, Agent, or Firm* — Drinker Biddle & Reath LLP (57) ABSTRACT

A control device of a diesel engine, including an acceleration detector including an acceleration sensor, the acceleration sensor being attached to an engine body that defines a combustion chamber, the acceleration detector configured to output a vibration acceleration, an integrator configured to integrate values corresponding to amplitudes of the vibration acceleration from a predetermined integration start timing that is at least before an ignition timing, a comparison unit configured to compare an integration value of the integrator with a predetermined ignition timing judgment level, and a real ignition timing judgment unit configured to judge a real ignition timing on the basis of a reach timing, at which the integration value has reached the ignition timing judgment level.

10 Claims, 11 Drawing Sheets

CONTROL DEVICE OF DIESEL ENGINE AND METHOD OF CONTROLLING DIESEL ENGINE

This application claims priority under 35 U.S.C. §119 to Japanese Patent Application No. 2009-050580, filed on Mar. 4, 2009, which is incorporated by reference herein in its entirety.

FIELD OF THE INVENTION

The present invention relates generally to a control device of a diesel engine and a method of controlling a diesel engine. The control device estimates or detects a real ignition timing of the diesel engine.

BACKGROUND OF THE INVENTION

An ignition timing of a diesel engine is basically controlled on the basis of a fuel-injection timing. However, it is difficult to directly detect an actual ignition timing. Hence, whether the actual ignition timing correctly meets a desirable ignition timing is usually uncertain. The ignition timing of the diesel engine affects a nitrogen oxide (NOx) emission quantity in exhaust gas and fuel consumption. It is important to control the actual ignition timing to meet the desirable ignition timing for achieving an ideal balance between the NOx emission quantity and the fuel consumption, which have a trade-off relationship.

Japanese Unexamined Patent Publication No. 9-144583 discloses a technique including a vibration sensor (a so-called knock sensor) attached to a cylinder block of a diesel engine. The technique simply judges a timing, at which an amplitude of vibration of the vibration sensor has reached a certain level, as an ignition timing.

However, in fact, many vibrational components are present in addition to a vibrational component due to ignition and burning. It is difficult to completely separate the vibrational component due to the ignition and burning from the other vibrational components. In addition, vibration may vary among burning cycles. It is difficult to correctly judge the ignition timing by the method of the related art.

SUMMARY OF THE INVENTION

In an embodiment, the invention provides a control device of a diesel engine, including an acceleration detector including an acceleration sensor, the acceleration sensor being attached to an engine body that defines a combustion chamber, the acceleration detector configured to output a vibration acceleration, an integrator configured to integrate values corresponding to amplitudes of the vibration acceleration from a predetermined integration start timing that is at least before an ignition timing, a comparison unit configured to compare an integration value of the integrator with a predetermined ignition timing judgment level, and a real ignition timing judgment unit configured to judge a real ignition timing on the basis of a reach timing, at which the integration value has reached the ignition timing judgment level.

In another embodiment, the invention provides a method of controlling a diesel engine, including detecting a vibration acceleration by an acceleration sensor attached to an engine body that defines a combustion chamber, outputting the vibration acceleration, integrating values corresponding to amplitudes of the vibration acceleration from a predetermined integration start timing that is at least before an ignition timing, comparing an integration value with a predetermined ignition timing judgment level, and judging a real ignition timing on the basis of a reach timing, at which the integration value has reached the ignition timing judgment level.

The basic principle of the embodiment is to successively integrate the absolute value corresponding to the amplitude of the vibration acceleration from the proper integration start timing that is at least before the ignition timing. The integration value monotonically increases, and contains vibrational components other than a vibrational component due to ignition and burning. When the phase reaches the ignition and burning and a vibrational component due to burning is integrated, the integration value relatively increases. On the basis of the study by the inventors of the embodiment, it is assumed that a predetermined burning state is achieved at the reach timing, at which the integration value has reached a certain threshold value, that is, the ignition timing judgment level. The reach timing correctly correlates with the actual real ignition timing without being affected by the other vibrational components.

With the aspect of the present invention, the real ignition timing can be accurately estimated or detected without being affected by the various vibrational components other than a vibrational component due to burning of the diesel engine.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
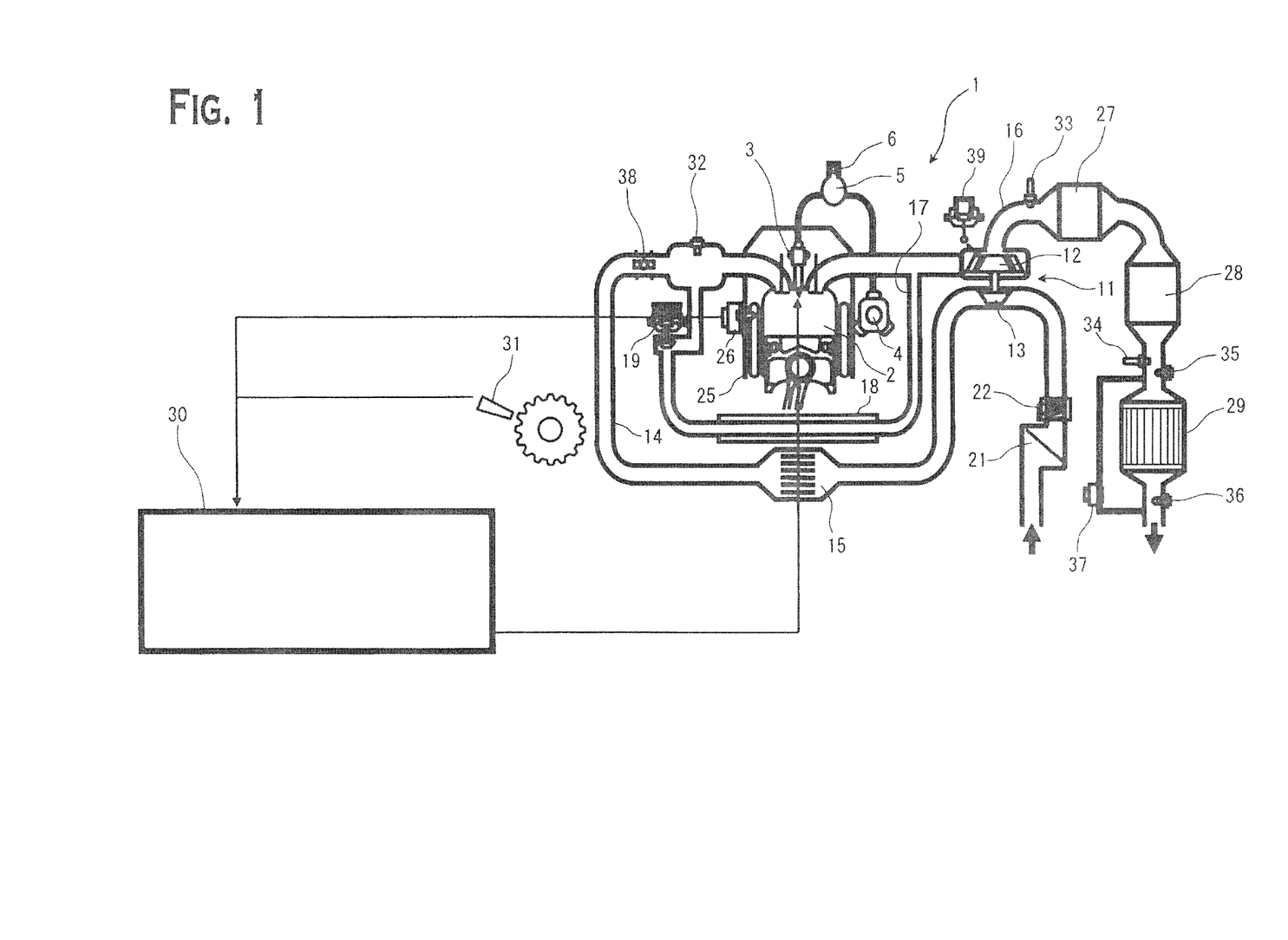
FIG. 1 is an explanatory view showing the configuration of a diesel engine to which a control device according to an embodiment of the present invention is applied.

FIG. 1 illustrates the general configuration of a diesel engine 1 to which the present invention may be applied. The diesel engine 1 includes a common-rail fuel injection device. A fuel injection nozzle 3 is provided at an upper center position of a combustion chamber 2 of each cylinder. Fuel is pressurized by a supply pump 4, accumulated in an accumulator (common rail) 5, then distributed to the fuel injection nozzle 3 of each cylinder, and injected depending on the open or closed state of each fuel injection nozzle 3. The accumulator 5 has a fuel pressure sensor 6 that detects a fuel pressure (rail pressure).

Also, the diesel engine 1 includes an exhaust turbine super charger 11 having an exhaust turbine 12 and a compressor 13, which are coaxially arranged. An intake channel 14 extends from the compressor 13 to the combustion chamber 2. An inter-cooler 15 is provided in the intake channel 14. An exhaust channel 16 extends from the combustion chamber 2 to the exhaust turbine 12. An exhaust gas recirculation (EGR) channel 17 is provided between the exhaust channel 16 and the intake channel 14. An EGR cooler 18 and an EGR control valve 19 are provided at the EGR channel 17. An air cleaner 21 and an air flow meter 22 are provided in the intake channel 14 at positions located upstream of the compressor 13.

A knock sensor 26 (an example of an acceleration detector) is attached to a side wall of a cylinder block 25, which is a part of an engine body. The knock sensor 26 serves as an acceleration sensor and responds to vibration of the cylinder block 25. A knock sensor 26 may be provided at every cylinder. However, in the embodiment, the single knock sensor 26 is provided at the cylinder block 25 at a proper position, at which the knock sensor 26 can detect vibration of all corresponding cylinders. A detection signal of the knock sensor 26 is input to a control unit 30. A fuel-injection timing of the fuel injection nozzle 3 is corrected to be advanced or delayed on the basis of the detection signal of the knock sensor 26, which will be described in more detail later.

An oxidation catalyst 27 and a NOx purification catalyst 28, which are catalysts that purify the exhaust gas, are provided in the exhaust channel 16 located downstream of the exhaust turbine 12 in that order from the upstream side. The NOx purification catalyst 28 absorbs, separates, and purifies NOx contained in the exhaust gas. In addition, a particulate trap filter, that is, a diesel particulate filter (DPF) 29 is provided in the exhaust channel 16 at a position located downstream of the NOx purification catalyst. The DPF 29 serves as an exhaust gas post-processing unit that traps exhaust particulates (particulate matters) contained in the exhaust gas and periodically eliminates or recycles the accumulated particulate matters by a method such as burning.

Input signals from various sensors are input to the control unit 30 serving as a control device. For example, the input signals include, in addition to detection signals from the knock sensor 26 and the air flow meter 22, detection signals from a crank angle sensor 31 that detects a crank angle (engine rotating speed) of a crank shaft, a boost pressure sensor 32 that detects a boost pressure, a first oxygen sensor 33 that detects an oxygen concentration at a position located upstream of the oxidation catalyst 27 in the exhaust channel 16, a second oxygen sensor 34 that detects an oxygen concentration at a position between the NOx purification catalyst 28 and the DPF 29 in the exhaust channel 16, an inlet temperature sensor 35 that detects an inlet temperature of the DPF 29, an outlet temperature sensor 36 that detects an outlet temperature of the DPF 29, and a DPF differential pressure sensor 37 that detects a differential pressure at positions located upstream and downstream of the DPF 29, as well as detection signals from sensors, such as a water temperature sensor that detects a cooling water temperature, an accelerator pedal opening sensor that detects a degree of depression of an accelerator pedal, and an intake temperature sensor that detects an intake temperature. The control unit 30 outputs control signals to the fuel injection nozzle 3, an intake throttle valve 38 that adjusts a throttle level of the intake channel 14, a pressure control valve 39 that adjusts an opening degree of a variable nozzle of the exhaust turbine super charger 11, etc., on the basis of the detection signals, and controls the operations of these valves.

Figure 2:
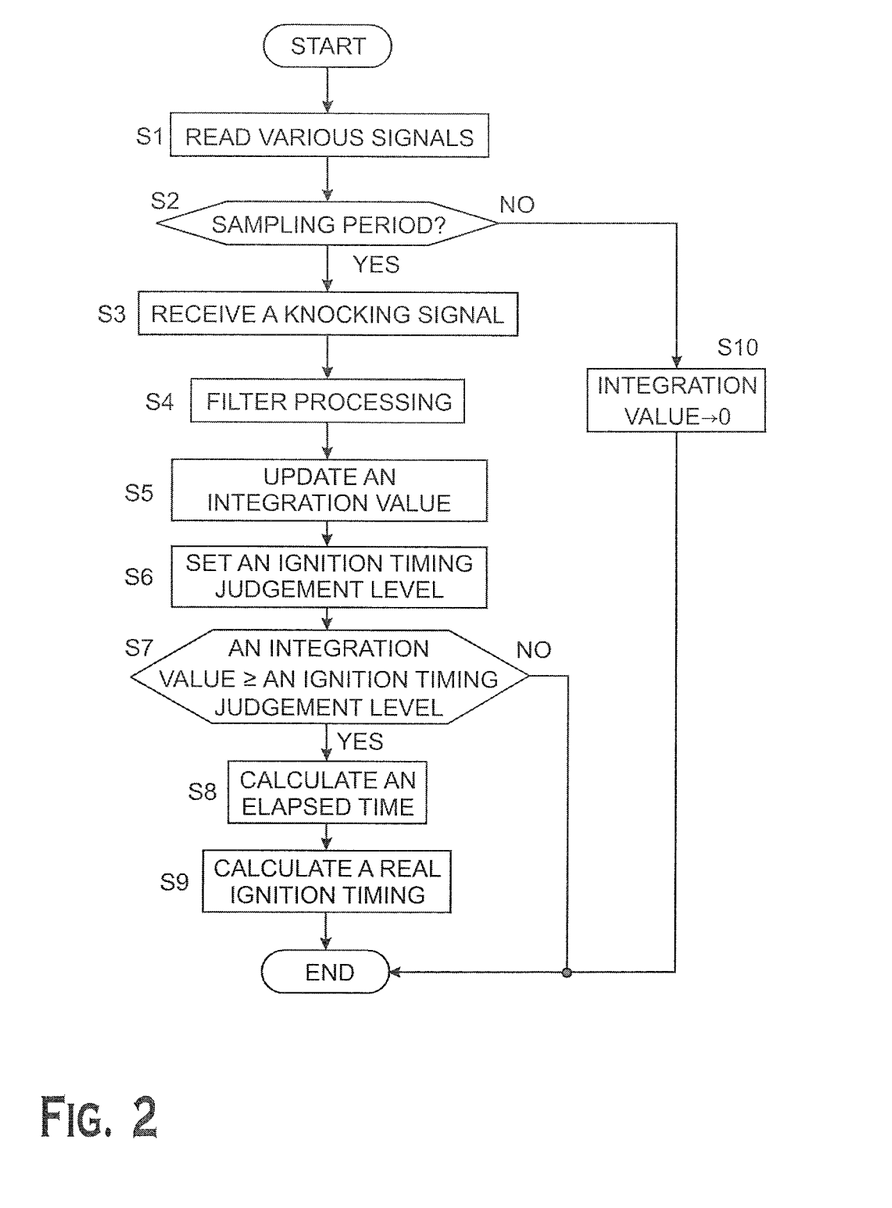
FIG. 2 is a flowchart showing the flow of processing for ignition timing detection.

FIG. 2 is a flowchart showing the flow of processing for real ignition timing detection that is performed by the control unit 30. This routine is performed repeatedly at every predetermined calculation interval (for example, at every predetermined crank angle or at every predetermined period of time).

In step S1, various signals, such as a crank angle (CA) detected by the crank angle sensor 31, are read. In step S2, it is judged whether the crank angle is within a predetermined sampling period $\Delta\theta smp$ (see FIG. 3) in a burning cycle of each cylinder. If the crank angle is rot within the sampling period $\Delta\theta smp$, in step S10, an integration value (described in greater detail later) is initialized to 0.

Figure 3:
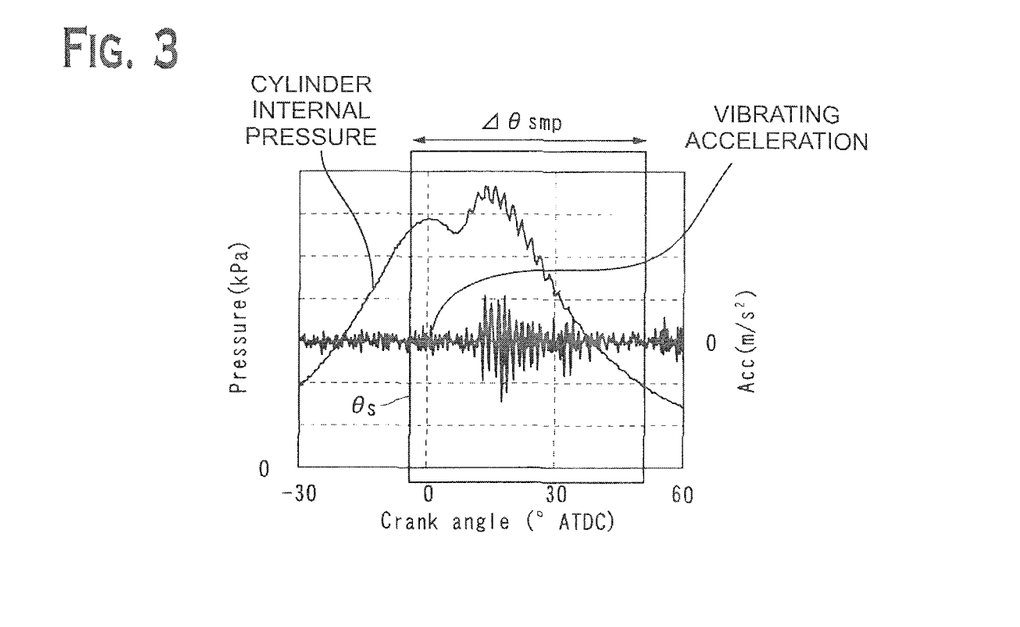
FIG. 3 is an explanatory view showing an example of a sampling period.

Referring to FIG. 3, the sampling period $\Delta\theta smp$ includes at least an ignition timing, and corresponds to a period from a start timing, that is, an integration start timing $\theta s$ to about 50° CA so as to extract a generation period of a burning pressure. The sampling period may be variable in accordance with an engine operating condition. For example, rising of a pressure rise rate $dP/d\theta$ and rising of heat generation may be detected or estimated, and a sampling period may be determined as a period from an uncontrolled burning period to an afterburning period. When previous injection and after injection are performed in addition to main fuel-injection, it is desirable to determine the sampling period such that the sampling period is not overlapped with injection periods of the previous injection and after injection so as not to be affected by vibration of the previous injection and after injection. The integration start timing $\theta s$ is determined as a timing at a main fuel-injection start timing or later and at least before the ignition timing (which will be described later).

Figure 4:
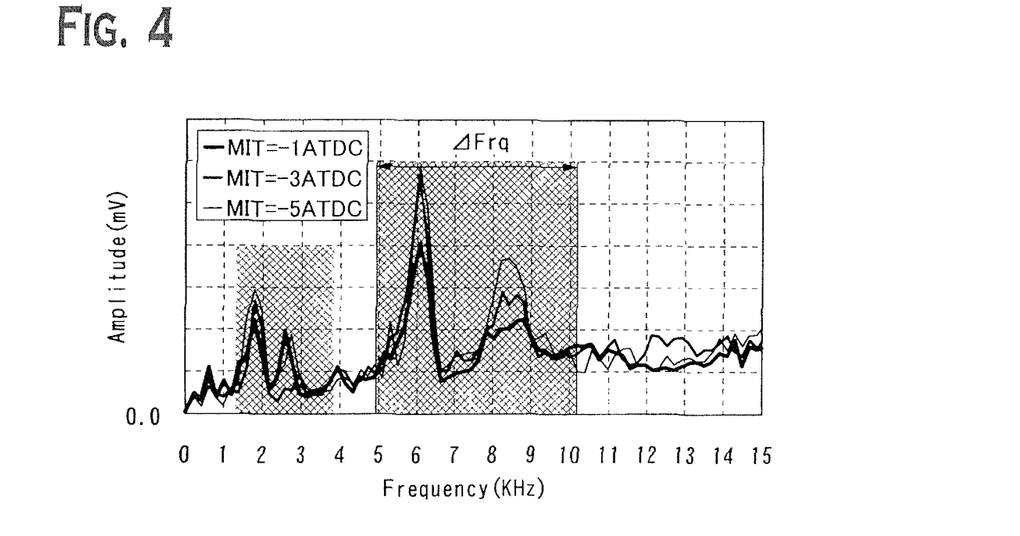
FIG. 4 is an explanatory view showing an example of a frequency range of a vibration acceleration to be integrated.

If the crank angle is within the sampling period, the routine goes on to step S3, in which a knocking signal that is, a vibration acceleration output from the knock sensor 26 is read. In step S4, band-pass filter processing (or high-pass filter processing) is performed to extract only a signal in a predetermined frequency range $\Delta Frq$ while a frequency band, which is clearly expected as noise, is eliminated. Referring to FIG. 4, the predetermined frequency range $\Delta Frq$ is determined as, for example, a range from about 5 to 10 kHz, or a range from about 5 to 20 kHz so as to extract vibration due to burning. A range from about 2 to 4 kHz typically contains many vibrational components due to driving of the fuel injection nozzle 3, the vibration which is generated simultaneously with the burning period. Thus, it is desirable to eliminate at least this range.

In step S5, a value corresponding to an amplitude of the vibration acceleration (absolute value) is integrated every predetermined sampling cycle, and an integration value is updated (integrator, integration means). The sampling cycle (calculation interval) is determined as, a unit crank angle of 1° CA, or $1/(360/0.25 \times Ne/60) \times 10^6$ (µs). For integration of the absolute value, in the embodiment, a square value of a vibration acceleration, which is inverted between positive and negative values, is successively integrated.

Figure 8:
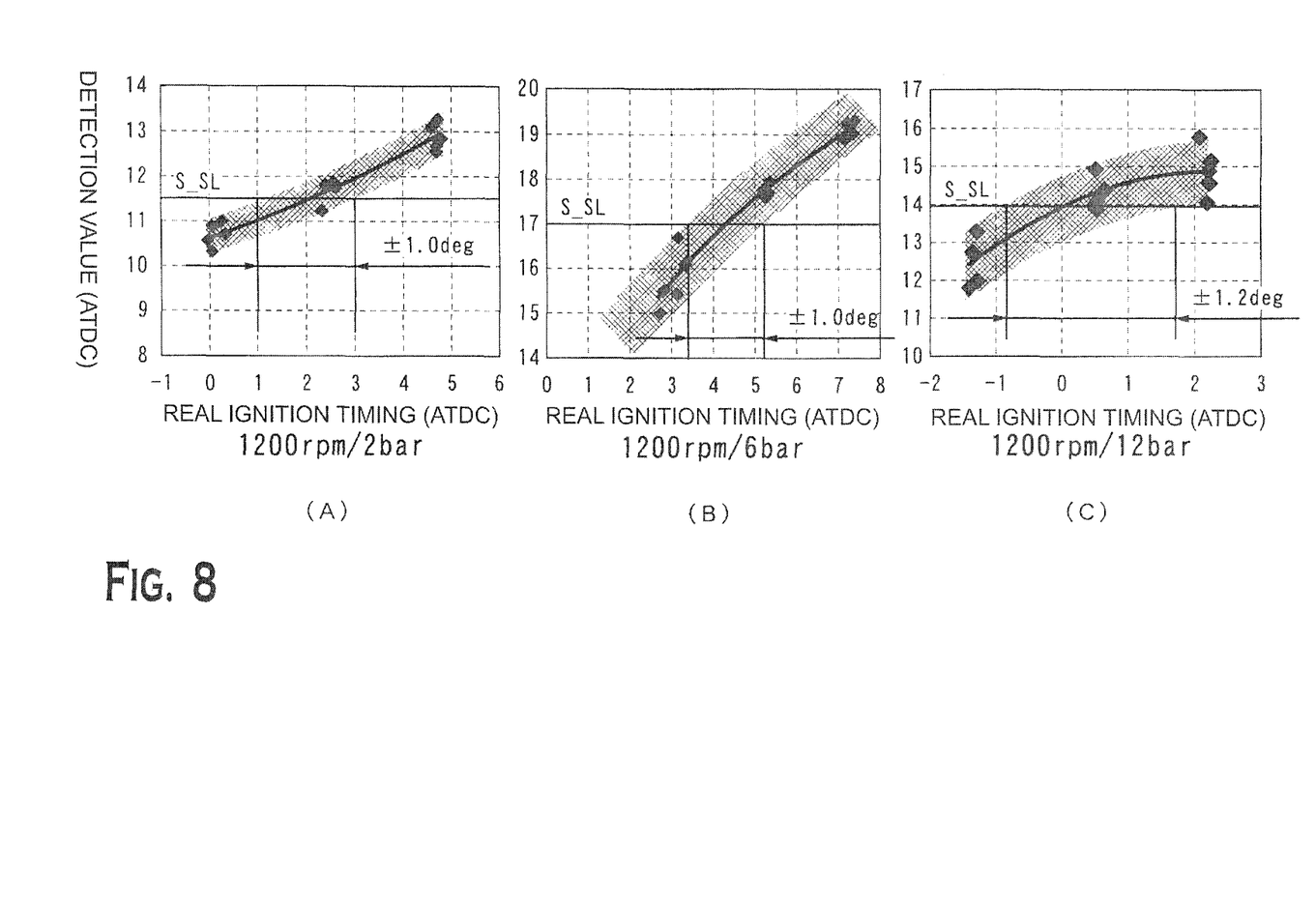
FIG. 8 illustrates explanatory views showing the relationship between detection values and real ignition timings with three different operating conditions (A) to (C)

In step S6, an ignition timing judgment level S_SL is determined on the basis of a current engine operating condition, that is, a load (torque, fuel injection quantity), an engine rotating speed, a fuel pressure, etc. That is, the ignition timing judgment level S_SL is variable in accordance with the engine rotating speed etc. as shown in FIG. 8. In step S7, an integration value Sθ at each crank angle is compared with the ignition timing judgment level S_SL (comparison unit, comparison means).

If the integration value Sθ has not reached the ignition timing judgment level S_SL, this routine is ended. In contrast, if the integration value Sθ has reached the ignition timing judgment level S_SL, the routine goes on to steps S8 and S9, in which a real ignition timing rT_ign is calculated on the basis of a reach timing, at which the integration value Sθ has reached the ignition timing judgment level S_SL (an example of a real ignition timing judgment unit, real ignition timing judgment means). More specifically, an elapsed time from the integration start timing to the reach timing is calculated (S8), and the elapsed time is converted into a crank angle to obtain the real ignition timing rT_ign (crank angle) (S9).

In the above-described example, the processing is performed on a real time base. However, a series of processing containing sampling may be performed on a crank angle base. In this case, the conversion processing from the real time into the crank angle in step S9 may be omitted, and the real ignition timing rT_ign (crank angle) may be directly obtained from the reach timing (crank angle).

Figure 5:
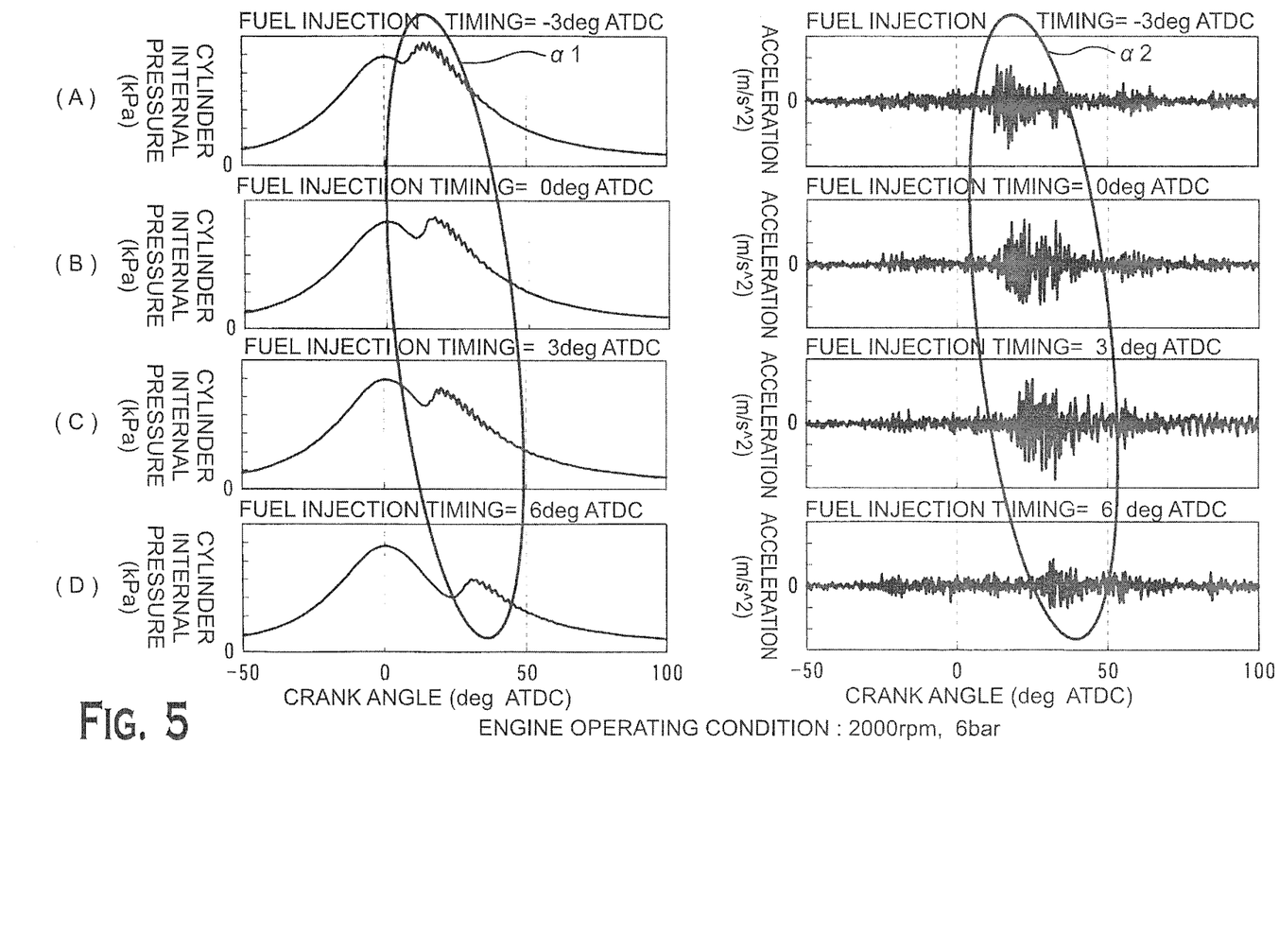
FIG. 5 illustrates explanatory views showing changes in cylinder internal pressures and changes in vibration accelerations at different injection timings (A) to (D)
Figure 6:
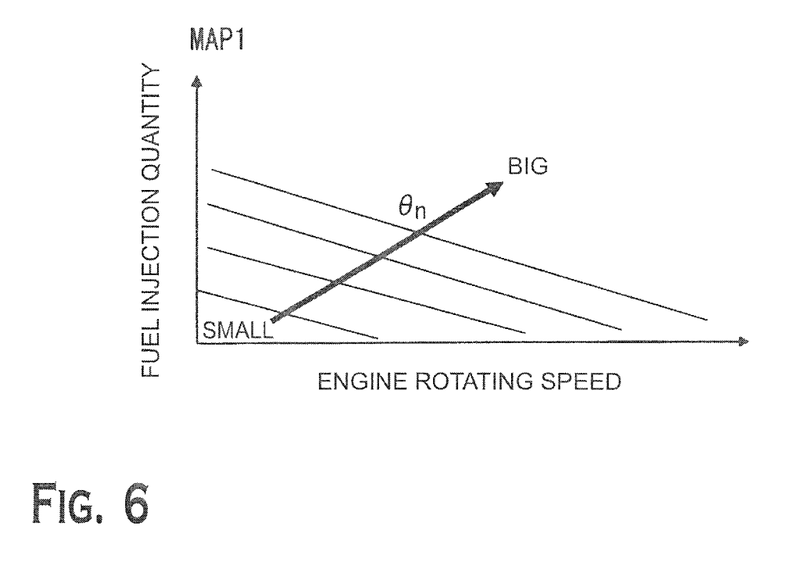
FIG. 6 is a characteristic diagram showing the characteristic of a first control map.

FIG. 5 illustrates explanatory views showing changes in cylinder internal pressures and changes in vibration accelerations output from the knock sensor 26 at different injection timings (A) to (D). As the injection timing (main fuel-injection start timing) is more delayed, a cylinder internal pressure rise region α1 and a vibration increase region α2 resulted from ignition and burning are more delayed. Thus, the integration start timing θs is determined in accordance with the main fuel-injection start timing. The integration start timing θs is determined as a timing at the main fuel-injection start timing or later, more specifically, a timing (MIT+θn) delayed from a main fuel-injection start timing MIT by a predetermined transmission delay period θn that takes into account a response delay of a vibration transmission system such as a cylinder block. To be more specific, the transmission delay period θn is determined in accordance with an engine rotating speed and a fuel injection quantity with reference to a first control map MAP1 in FIG. 6. Referring to FIG. 6, the transmission delay period θn is increased as the engine rotating speed becomes higher and as the fuel injection quantity becomes larger. Hence, noise components other than a noise component due to the injection and burning by fuel injection can be accurately eliminated.

Referring to FIG. 5, the intensity (amplitude) of the vibration acceleration becomes smaller as the fuel-injection start timing is more delayed from a top dead center. Thus, in step S6, it is desirable to lower the ignition timing judgment level S_SL as the fuel-injection start timing is more delayed from the top dead center.

Figure 7:
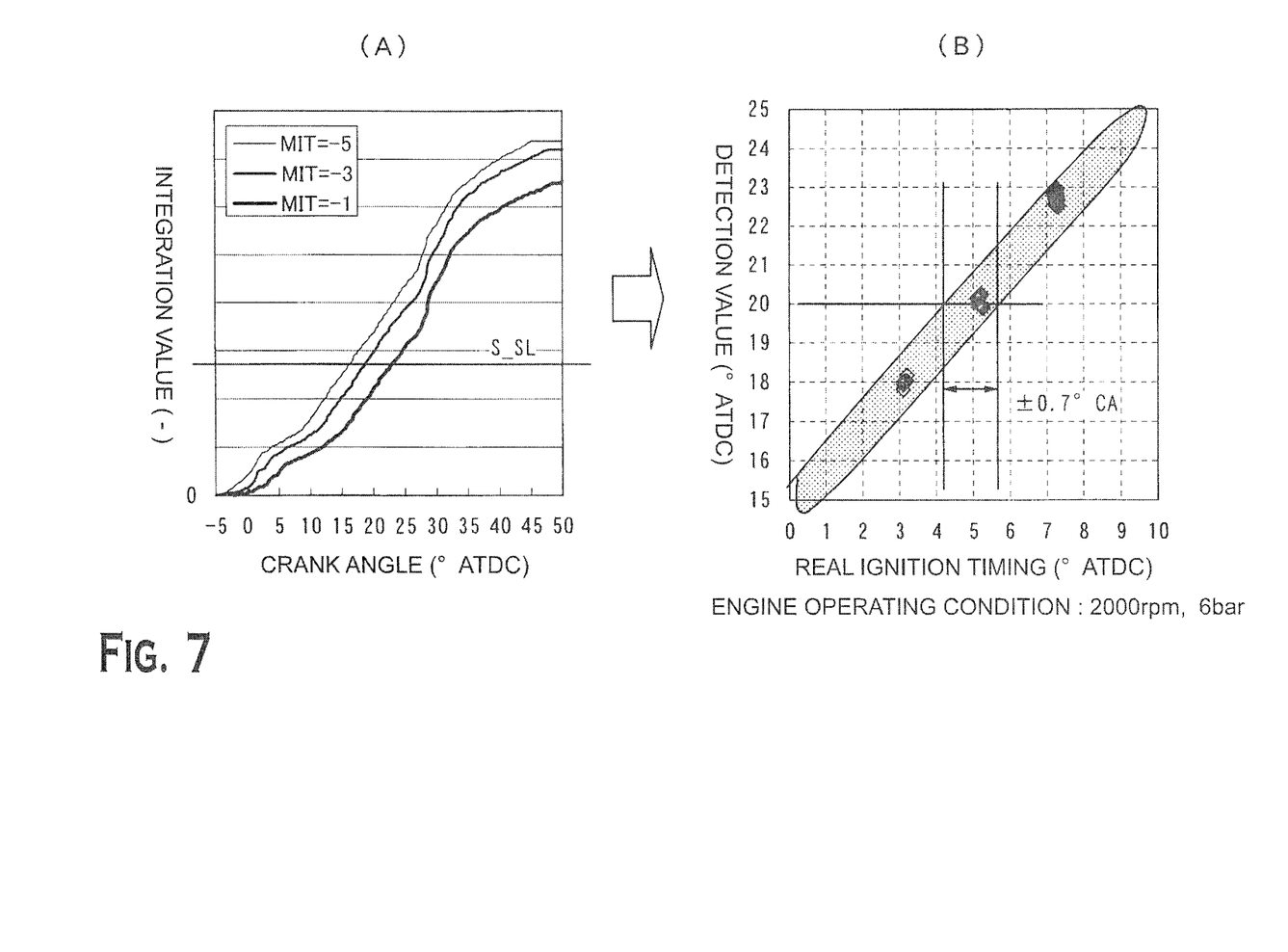
FIG. 7 illustrates explanatory views showing integration values and detection values at three different injection timings.

FIG. 7 illustrates changes in integration values (integral values) at different main fuel-injection start timings MIT (ATDC), and variations and errors in real ignition timings with respect to detection values. The "detection value" is a crank angle (ATDC) at the reach timing, at which the integration value has reached the ignition timing judgment level S_SL. The real ignition timing is determined on the basis of the detection value. In this example, the real ignition timing is a timing advanced by about 15° from the detection value. Referring to FIG. 7, a variation in real ignition timing with respect to the detection value (crank angle at the reach timing) is within a small range of about ±0.7° CA irrespective of the main fuel-injection start timing. By eliminating the influence of noise vibration other than vibration due to burning by fuel injection, the real ignition timing can be accurately obtained.

FIG. 8 illustrates the relationship between detection values and real ignition timings with three operating conditions (A) to (C) having different exhaust representative points. Referring to FIG. 8, even when the engine operating conditions differ from one another, an error in real ignition timing with respect to the crank angle or the detection value at the reach timing is within a range of ±1.2° CA or narrower. Thus, the real ignition timing can be accurately obtained irrespective of the engine operating condition.

Figure 9:
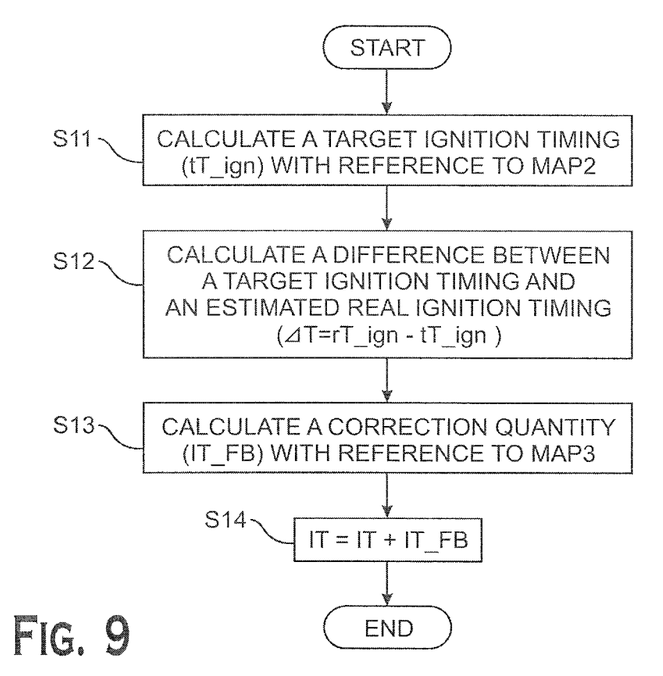
FIG. 9 is a flowchart showing the flow of processing for ignition timing correction.
Figure 10:
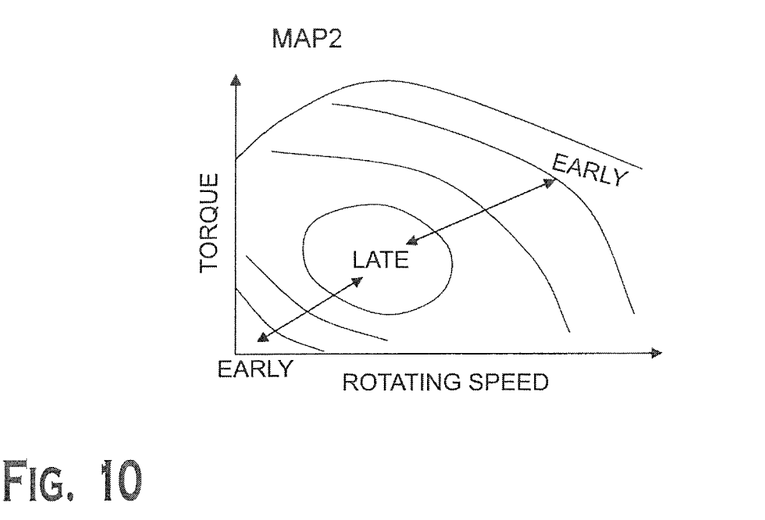
FIG. 10 is a characteristic diagram showing the characteristic of a second control map.
Figure 12:
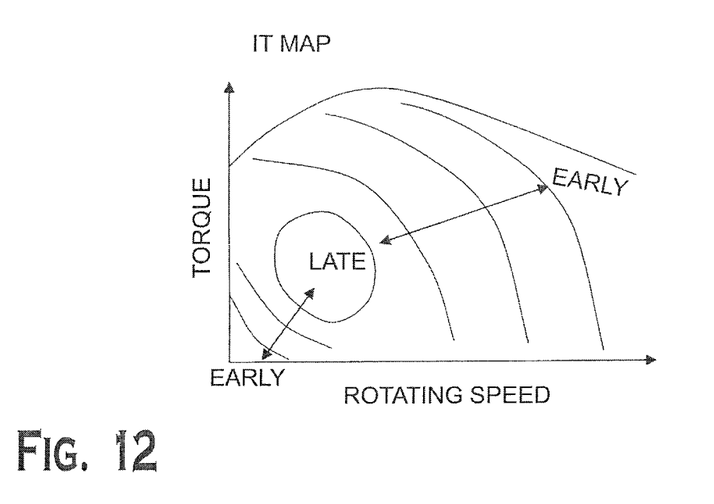
FIG. 12 is a characteristic diagram showing the characteristic of a target injection timing map.

The real ignition timing rT_ign thus obtained can be used for various control in the diesel engine 1. FIG. 9 is a flowchart showing, for example, correction of an injection timing IT by using the real ignition timing rT_ign. In step S11, a target ignition timing tT_ign is calculated and determined on the basis of a current engine operating condition, that is, a load (torque) and an engine rotating speed with reference to a second control map MAP2 shown in FIG. 10 (an example of a target ignition timing determination unit). In the second control map MAP2, a desirable ignition timing is assigned to each operational point. The second control map MAP2 has a basically similar characteristic to a target injection timing map shown in FIG. 12, in which a target injection timing IT is assigned in accordance with an engine operating condition (load and engine rotating speed).

Figure 11:
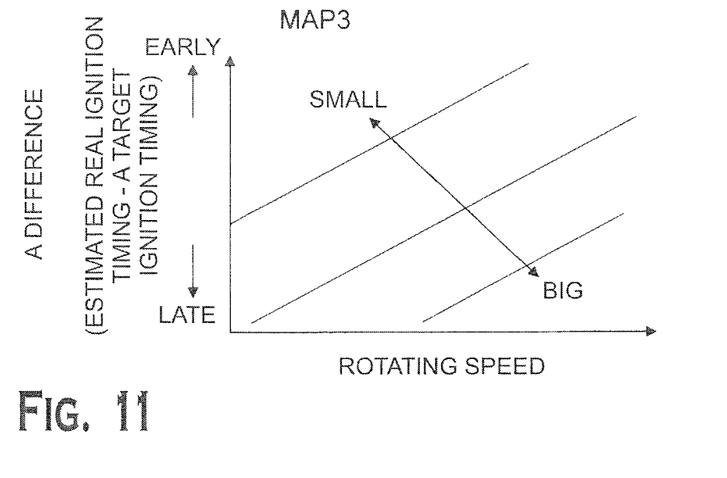
FIG. 11 is a characteristic diagram showing the characteristic of a third control map.

In step S12, a difference ΔT (=rT_ign−tT_ign) between the target ignition timing tT_ign and the estimated real ignition timing fling is obtained. In step S13, an injection timing correction quantity IT_FB corresponding to the difference ΔT is obtained with reference to a third control map MAP3 shown in FIG. 11. The injection timing and the ignition timing do not have "one-to-one relation." For example, although the injection timing is changed by 1° CA, the ignition timing may not be changed by 1° CA. Also, the correlation between the injection timing and the ignition timing may be changed depending on the operating condition. Owing to this, in the third map MAP3, a correction quantity IT_FB is assigned to bring the real ignition timing rT_ign closer to the target ignition timing tT_ign. The correction quantity IT_FB obtained with reference to the third control map MAP3 is added to a current injection timing IT in step S14 (an example of a fuel-injection timing correction unit). The correction quantity IT_FB may be learned and saved as a correction quantity for each operational point if needed.

Figure 13:
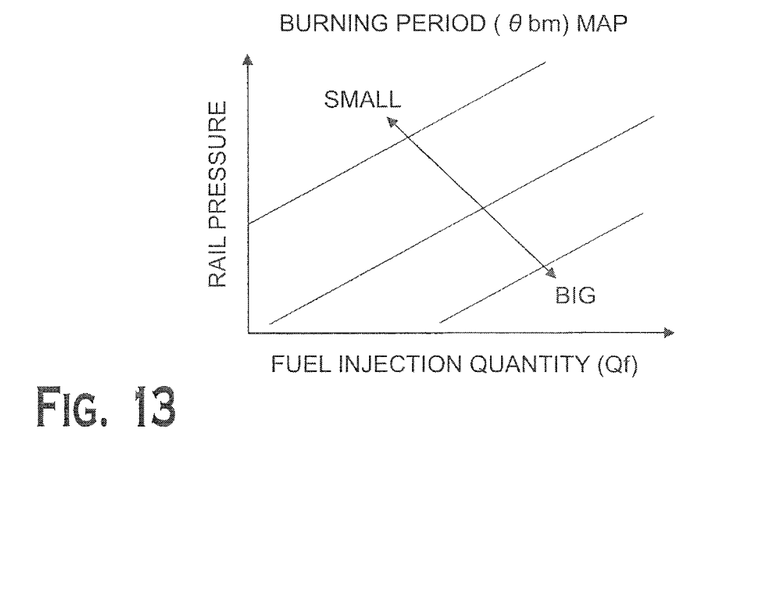
FIG. 13 is a characteristic diagram showing the characteristic of a burning period map.

The sampling period is determined as a period from, for example, the integration start timing to 50° CA. However, the range does not have to be fixed. The range may be variable by taking into account the engine operating condition, in particular, a fuel injection quantity Qf, a rail pressure Pf, an injection timing IT, etc. For example, a burning period θbrn correlates with the rail pressure Pf and the fuel injection quantity Qf The burning period θbrn may be calculated with reference to, for example, a burning period map having a characteristic as shown in FIG. 13.

A minimum sampling period containing only the burning period can be obtained as long as a start timing θs of the sampling period is determined as "θs=IT+θn" by taking into account a predetermined transmission delay period θn, and an end timing θf is determined as "θf=IT+θn+θbrn," so that the start timing θs and the end timing θf can be variable. For example, when previous injection or after injection is performed, this sampling period is advantageous to avoid the influence of the previous injection and after injection.

Figure 14:
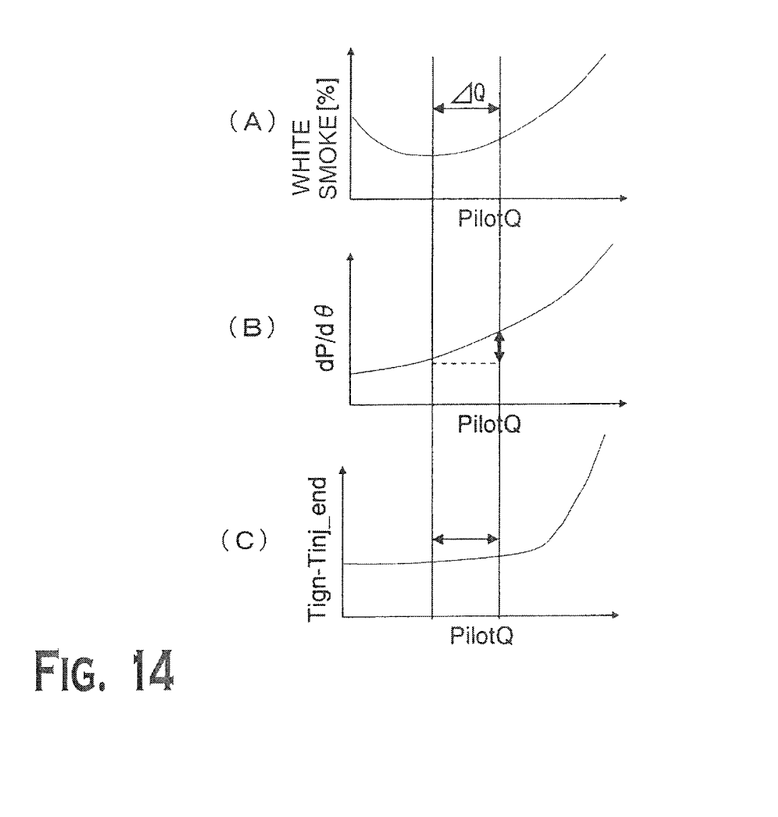
FIG. 14 illustrates explanatory views showing, for example, a change in white smoke etc. with respect to a pilot injection quantity.

FIG. 14 illustrates characteristic diagrams showing a change in occurrence rate (%) of white smoke with respect to a pilot injection quantity, a change in (maximum) pressure rise rate $dP/d\theta$ in the combustion chamber, and a change in difference between a real ignition timing Tign and a main fuel-injection end timing Tinj_end. The main fuel-injection end timing Tinj_end is obtained by adding the injection period to the injection start timing. The injection timing is obtained on the basis of a target value of a main fuel-injection quantity and a rail pressure.

When a water temperature is low, in particular, when a load is small such as during idling, pilot injection is performed before main fuel-injection, in order to reduce burning noise by mixing fuel before the ignition. The occurrence rate of white smoke in the low-water-temperature and small-load region is basically dependent on a pilot injection quantity PilotQ as shown in FIG. 14(A). If the pilot injection quantity becomes too large or too small, white smoke increases. Thus, when the load is small during idling at the low water temperature, the pilot injection quantity is limited within a predetermined range $\Delta Q$ to reduce the occurrence rate of white smoke.

Meanwhile, in order to suppress the occurrence rate of white smoke, the pressure rise rate $dP/d\theta$ in the combustion chamber, and the period from the real ignition timing Tign to the main fuel-injection end timing Ting_end (Tign−Tinj_end) may be limited to predetermined values or smaller. When the pilot injection quantity PilotQ is changed, the pressure rise rate $dP/d\theta$ in the combustion chamber is markedly changed because of the influence of wall flow although an ignition timing for main burning and a ratio of diffusive burning are substantially unchanged. To be more specific, referring to FIG. 14(B), the ratio of burning during the main burning increases because of the wall flow as the pilot injection quantity PilotQ increases. Hence, the pressure rise rate $dP/d\theta$ increases. However, the sensitivity to the pilot injection quantity PilotQ is low during the period (Tign−Tinj_end). The sensitivity is not substantially changed although the pilot injection quantity PilotQ is changed within the range $\Delta Q$. Hence, the pilot injection quantity PilotQ is corrected within the predetermined range $\Delta Q$ so that the pressure rise rate $dP/d\theta$ is a predetermined value or smaller (an example of a pilot injection quantity correction unit). For example, when the pressure rise rate $dP/d\theta$ is above the predetermined value, the pilot injection quantity PilotQ is corrected to be decreased, so as to lower the pressure rise rate $dP/d\theta$. Thus, the likelihood of occurrence of white smoke can be effectively reduced in the small-load region including idling at the low water temperature.

Figure 15:
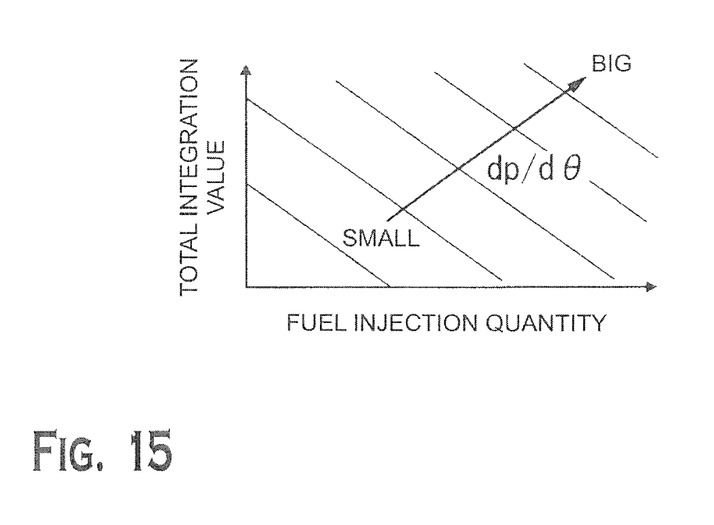
FIG. 15 is a characteristic diagram showing the characteristic of a pressure rise rate map.

The pressure rise rate $dP/d\theta$ is directly detected by using the cylinder internal pressure sensor that directly detects, for example, the pressure in the combustion chamber. Alternatively, such an expensive cylinder internal pressure sensor may not be used. The pressure rise rate $dP/d\theta$ may be estimated on the basis of a total integration value and a fuel injection quantity with reference to a control map shown in FIG. 15. Referring to FIG. 15, the pressure rise rate $dP/d\theta$ becomes higher as the total integration value increases and as the injection quantity increases. The total integration value is a square value of an amplitude of a vibration acceleration within a predetermined frequency range in a sampling period. The total integration value corresponds to burning intensity. The predetermined frequency range used for calculation of the total integration value may use the same frequency range (5 to 10 kHz, 5 to 20 kHz) as that of the integration value $\theta s$. However, to more accurately extract the burning intensity, the frequency range may be narrower such as in a range from 8 to 10 kHz.

As described above, in the embodiment, the vibration acceleration output from the knock sensor 26 is used, which is common to a plurality of cylinders and used typically for detecting knocking of an existing diesel engine, so as to eliminate a frequency band considered as noise. Then, the square value (absolute value) of the amplitude of the vibration acceleration is integrated from the proper integration start timing. Since the integration start timing is determined as a proper timing at the main fuel-injection timing or later and before the ignition timing while taking into account the vibration transmission delay of the cylinder block 25, noise other than vibration due to the ignition and burning is eliminated, and hence the integration value of the vibration acceleration due to the ignition and burning can be accurately obtained. The real ignition timing of each cylinder can be accurately obtained without being affected by various vibrational components other than a vibrational component due to burning, on the basis of the reach timing (crank angle), at which the integration value has reached the ignition timing judgment level.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A control device of a diesel engine, comprising:
    an acceleration detector including an acceleration sensor, the acceleration sensor being attached to an engine body that defines a combustion chamber, the acceleration detector configured to output a vibration acceleration;
    an integrator configured to integrate values corresponding to amplitudes of the vibration acceleration due to burning from a predetermined integration start timing that is at least before an ignition timing;
    a comparison unit configured to compare an integration value of the integrator with a predetermined ignition timing judgment level; and
    a real ignition timing judgment unit configured to judge a real ignition timing on the basis of a reach timing, at which the integration value has reached the ignition timing judgment level.

2. The control device of the diesel engine according to claim 1, further comprising:
    a filter configured to extract the vibration acceleration within a predetermined frequency range,
    wherein the integrator integrates square values of the vibration acceleration within the predetermined frequency range.

3. The control device of the diesel engine according to claim 1, wherein the integration start timing is determined on the basis of a main fuel-injection start timing.

4. The control device of the diesel engine according to claim 3, wherein the integration start timing is determined as a timing at the main fuel-injection start timing or delayed by a predetermined transmission delay period.

5. The control device of the diesel engine according to claim 1, wherein the ignition judgment level is determined in accordance with an engine operating condition.

6. The control device of the diesel engine according to claim 1, further comprising:
a target ignition timing determination unit configured to determine a target ignition timing in accordance with an engine operating condition; and
a fuel injection timing correction unit configured to correct a fuel injection timing so that the real ignition timing becomes closer to the target ignition timing through comparison between the target ignition timing and the real ignition timing.

7. The control device of the diesel engine according to claim 1, further comprising a pilot injection quantity correction unit configured to correct a pilot injection quantity for pilot injection on the basis of a pressure rise rate in the combustion chamber, the pilot injection being performed before a main fuel-injection.

8. The control device of the diesel engine according to claim 7, further comprising a calculator configured to calculate a total integration value by integrating the values corresponding to the amplitudes of the vibration acceleration in a predetermined frequency range during a predetermined sampling period that contains at least the ignition timing, and to calculate the pressure rise rate on the basis of the total integration value and a fuel injection quantity.

9. A control device of a diesel engine, comprising:
acceleration detection means including an acceleration sensor, the acceleration sensor being attached to an engine body that defines a combustion chamber, the acceleration detection means outputting a vibration acceleration;
integration means for integrating values corresponding to amplitudes of the vibration acceleration due to burning from a predetermined integration start timing that is at least before an ignition timing;
comparison means for comparing an integration value of the integration means with a predetermined ignition timing judgment level;
real ignition timing judgment means for judging a real ignition timing on the basis of a reach timing, at which the integration value has reached the ignition timing judgment level.

10. A method of controlling a diesel engine, comprising:
detecting a vibration acceleration by an acceleration sensor attached to an engine body that defines a combustion chamber;
outputting the vibration acceleration;
integrating values corresponding to amplitudes of the vibration acceleration due to burning from a predetermined integration start timing that is at least before an ignition timing;
comparing an integration value with a predetermined ignition timing judgment level;
judging a real ignition timing on the basis of a reach timing, at which the integration value has reached the ignition timing judgment level.

* * * * *